United States Patent
Shah et al.

(10) Patent No.: US 11,836,158 B2
(45) Date of Patent: Dec. 5, 2023

(54) DEPLOYMENT OF CONTAINER-BASED COMPUTER ENVIRONMENTS

(71) Applicant: MicroStrategy Incorporated, Vienna, VA (US)

(72) Inventors: Shreyas Shah, Vienna, VA (US); Michael David Hudson, Roanoke, VA (US); Jay Indravadan Shah, Aldie, VA (US); Clayton Myers, Oak Hill, VA (US); Jehan Jayant Sethna, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 594 days.

(21) Appl. No.: 16/780,868

(22) Filed: Feb. 3, 2020

(65) Prior Publication Data
US 2021/0240734 A1    Aug. 5, 2021

(51) Int. Cl.
*G06F 16/00*     (2019.01)
*G06F 16/28*     (2019.01)
(Continued)

(52) U.S. Cl.
CPC ........ *G06F 16/283* (2019.01); *G06F 9/45558* (2013.01); *G06F 9/54* (2013.01);
(Continued)

(58) Field of Classification Search
CPC ....... G06F 9/45558; G06F 2009/45595; G06F 8/71; G06F 9/44505; G06F 2009/45579;
(Continued)

(56) References Cited

U.S. PATENT DOCUMENTS 7,457,248 B1    11/2008   Ali et al.
8,238,913 B1    8/2012    Bhattacharyya et al.
(Continued)

OTHER PUBLICATIONS

Doc-archives.microstrategy.com [online], "Installing and Configuring MicroStrategy Library," Jun. 2017, retrieved on Oct. 25, 2019, retreived from URL <https://doc-archives.microstrategy.com/producthelp/10.10/InstallConfig/WebHelp/Lang_1033/Content/install_config_library.htm>.

(Continued)

*Primary Examiner* — Yicun Wu
(74) *Attorney, Agent, or Firm* — Fish & Richardson P.C.

(57) ABSTRACT

Methods, systems, and apparatus, including computer programs encoded on computer-storage media, for deployment of container-based computer environments. In some implementations, one or more computers provide data for a user interface comprising one or more user interface elements for initiating creation of a new container-based server environment. The one or more computers receive data indicating user interaction with the one or more user interface elements, and in response, create a new container-based server environment comprising multiple different containers hosted by a remote cluster of processing nodes, the multiple different containers being configured to provide different services that interoperate with each other. The one or more computers provide access to the new container-based server environment.

18 Claims, 4 Drawing Sheets

(51) Int. Cl.
*G06F 9/54* (2006.01)
*G06F 9/455* (2018.01)
(52) U.S. Cl.
CPC .. *G06F 16/285* (2019.01); *G06F 2009/45562* (2013.01); *G06F 2009/45595* (2013.01)
(58) Field of Classification Search
CPC .. G06F 2009/45587; G06F 8/63; G06F 8/656; G06F 9/44526; G06F 11/00; G06F 11/2005; G06F 11/2028; G06F 11/2035; G06F 3/06; G06F 8/65; G06F 11/1438; G06F 11/1451; G06F 11/1469; G06F 16/283; G06F 16/285; G06F 16/903; G06F 16/904; G06F 2009/45562; G06F 2009/45575; G06F 2201/84; G06F 8/60; G06F 8/61; G06F 9/455; G06F 9/5072; G06F 9/54
See application file for complete search history.

(56) References Cited

U.S. PATENT DOCUMENTS

| | | |
|---|---|---|
| 8,887,132 B1 | 11/2014 | Hunter |
| 9,122,562 B1 | 9/2015 | Stickle |
| 9,367,305 B1 | 6/2016 | Kumar et al. |
| 9,767,312 B2 | 9/2017 | Sahoo et al. |
| 9,928,210 B1 | 3/2018 | Zhang et al. |
| 9,959,104 B2 | 5/2018 | Chen et al. |
| 9,965,261 B2 | 5/2018 | Chen et al. |
| 10,002,247 B2 | 6/2018 | Suarez et al. |
| 10,007,509 B1 | 6/2018 | Quershi et al. |
| 10,101,985 B1 | 10/2018 | Prakash et al. |
| 10,169,023 B2 | 1/2019 | Ciano et al. |
| 10,191,778 B1 | 1/2019 | Yang et al. |
| 10,241,778 B2 | 3/2019 | Emeis et al. |
| 10,244,034 B2 | 3/2019 | Joshi et al. |
| 10,261,782 B2 | 4/2019 | Suarez et al. |
| 10,310,949 B1 | 6/2019 | Chakraborty et al. |
| 10,356,214 B2 | 7/2019 | Joshi et al. |
| 10,380,081 B2 * | 8/2019 | Brady ............... G06Q 10/1095 |
| 10,389,582 B1 | 8/2019 | Fakhouri et al. |
| 11,023,270 B2 | 6/2021 | Mahajan et al. |
| 11,062,022 B1 | 7/2021 | Kalamkar et al. |
| 11,106,455 B2 | 8/2021 | Myers et al. |
| 11,134,098 B1 * | 9/2021 | Lieberman .......... H04L 63/1425 |
| 11,182,193 B2 | 11/2021 | Skourtis et al. |
| 11,288,053 B2 | 3/2022 | Myers et al. |
| 2005/0060722 A1 | 3/2005 | Rochette et al. |
| 2008/0216056 A1 | 9/2008 | Bate et al. |
| 2011/0289503 A1 | 11/2011 | Toub et al. |
| 2016/0162277 A1 | 6/2016 | Fenzl et al. |
| 2017/0093923 A1 | 3/2017 | Duan |
| 2017/0147319 A1 | 5/2017 | Riek et al. |
| 2017/0154017 A1 | 6/2017 | Kristiansson et al. |
| 2017/0177860 A1 | 6/2017 | Suarez et al. |
| 2017/0177877 A1 | 6/2017 | Suarez et al. |
| 2017/0185488 A1 | 6/2017 | Kumarasamy et al. |
| 2017/0300311 A1 | 10/2017 | Lopez et al. |
| 2017/0315795 A1 | 11/2017 | Keller |
| 2018/0074855 A1 | 3/2018 | Kambatla |
| 2018/0075086 A1 | 3/2018 | Yam et al. |
| 2018/0088926 A1 | 3/2018 | Abrams |
| 2018/0088935 A1 | 3/2018 | Church et al. |
| 2018/0095778 A1 | 4/2018 | Aydelott et al. |
| 2018/0095973 A1 | 4/2018 | Huang et al. |
| 2018/0136931 A1 | 5/2018 | Hendrich et al. |
| 2018/0157516 A1 | 6/2018 | Kristiansson et al. |
| 2018/0173502 A1 | 6/2018 | Biskup et al. |
| 2018/0205652 A1 | 7/2018 | Saxena |
| 2018/0285199 A1 | 10/2018 | Mitkar et al. |
| 2018/0285210 A1 | 10/2018 | Mitkar et al. |
| 2018/0341471 A1 | 11/2018 | Stefanov et al. |
| 2019/0034313 A1 | 1/2019 | Vedurumudi et al. |
| 2019/0050680 A1 | 2/2019 | Waugh et al. |
| 2019/0095254 A1 | 3/2019 | Rao |
| 2019/0123956 A1 * | 4/2019 | Satapathy ............. H04L 49/356 |
| 2019/0132329 A1 | 5/2019 | Verberkt et al. |
| 2019/0163559 A1 | 5/2019 | Takahashi et al. |
| 2019/0208031 A1 | 7/2019 | Bennet et al. |
| 2019/0230130 A1 | 7/2019 | Beckman et al. |
| 2019/0235897 A1 | 8/2019 | Goel |
| 2019/0260716 A1 | 8/2019 | Lerner |
| 2019/0278669 A1 | 9/2019 | Mueller-Wicke et al. |
| 2019/0303541 A1 | 10/2019 | Reddy et al. |
| 2019/0354389 A1 | 11/2019 | Du et al. |
| 2019/0392045 A1 | 12/2019 | De Lima Junior et al. |
| 2020/0067763 A1 * | 2/2020 | Vytla ..................... H04L 41/082 |
| 2020/0356806 A1 | 11/2020 | Li et al. |
| 2020/0394120 A1 | 12/2020 | Salmi et al. |
| 2021/0042141 A1 | 2/2021 | De Marco et al. |
| 2021/0048995 A1 | 2/2021 | Myers et al. |
| 2021/0048998 A1 | 2/2021 | Myers et al. |
| 2021/0049002 A1 | 2/2021 | Myers et al. |
| 2021/0382846 A1 | 12/2021 | Miller et al. |
| 2022/0004381 A1 | 1/2022 | Myers et al. |
| 2022/0147378 A1 | 5/2022 | Tarasov et al. |
| 2022/0215111 A1 | 7/2022 | Ekins |
| 2022/0222070 A1 | 7/2022 | Kunjuramanpillai et al. |
| 2022/0229649 A1 | 7/2022 | Myers et al. |

OTHER PUBLICATIONS

Docs.docker.com [online], "Get Started, Part 1: Orientation and setup," 2017, retrieved on Oct. 25, 2019, retrieved from URL<https://docs.docker.com/get-started/>, 6 pages.

Dyn.com "Kubernetes: The Difference Between Containers and Virtual Machines," Feb. 2018, retrieved on Oct. 25, 2019, retrieved from URL <https://dyn.com/blog/kubernetes-the-difference-between-containers-and-virtual-machines/> 8 pages.

Edureka.co [online]. "Docker tutorial—Introduction to docker & containerization," 2017, retrieved on Oct. 25, 2019, retrieved from URL <https://www.edureka.co/blog/docker-tutorial>, 10 pages.

Kubernetes.io [online], "Concepts underlying the cloud controller manager," May 2019, retrieved on Jun. 20, 2019, retrieved from URL <https://kubernetes.io/docs/concepts/architecture/cloud-controller/>, 9 pages.

Kubernetes.io [online], "StatefulSet is the workload API object used to manage stateful applications," Jun. 2019, retrieved on Jun. 20, 2019, retrieved from URL <https://kubernetes.io/docs/concepts/workloads/controllers/statefulset/>, 9 pages.

Linkedin.com.[online], "Moving MicroStrategy to a docker/kubernetes infrastructure," Jan. 2018, retrieved from Oct. 25, 2019 retrieved from URL <https://www.linkedin.com/pulse/moving-microstrategy-dockerkubernetes-infrastructure-montero/>, 3 pages.

Linuxize.com [online], "How To Remove Docker Containers, Images, Volumes and Networks," Oct. 2018, retrieved on Oct. 25, 2019, retrieved from URL <https://linuxize.com/post/how-to-remove-docker-images-containers-volumes-and-networks#remove-one-or-more-containers>, 11 pages.

MicroStrategy.com [online]. "Microstrategy on Kubernetes," 2017, retrieved on Oct. 25, 2019, retrieved from URL <https://www.microstrategy.com/getmedia/d99b44dc-ec44-45lb-a5a3-3db7160282f0/Genesys-How-to-run-MicroStrategy-on-Kubernetes>, 10 pages.

Stackoverflow.com [online] "What's the difference between ClusterIP, NodePort and LoadBalancer service types in Kubernetes?" Jan. 2017, retrieved from URL <https://stackoverflow.com/questions/41509439/whats-the-difference-between-clusterip-nodeport-and-loadbalancer-service-types/52241241#52241241>, 6 pages.

Tuton, "Deploy A MongoDB replica set using the IBM Cloud Kubernetes Service," IBM Developer, Mar. 15, 2018, 14 pages.

Wikipedia.org [online], "Docker(software)," Mar. 2013, retrieved on Oct. 25, 2019, retrieved from URL <https://en.wikipedia.org/wiki/Docker_(software)>, 8 pages.

Wikipedia.org [online], "OS-level virtualization," Aug. 2006, retrieved on Oct. 25, 2019, retrieved from URL <https://en.wikipedia.org/wiki/OS-level_virtualization> , 4 pages.

(56) References Cited

OTHER PUBLICATIONS

Wikipedia.org [online], "System Image," Feb. 2013, retrieved Oct. 25, 2019, retrieved from URL<https://en.wikipedia.org/wiki/System_image>, 2 pages.

Wong, "What's the Difference Between Containers and Virtual Machines?," Electronic Design, retrieved from URL <http://electronicdesign.com/dev-tools/what-s-difference-between-containers-and-virtualmachines>, 3 pages.

Www.en.wikipedia.org [online], "Online Analytical Processing" Mar. 2018, retrieved on Mar. 19. 2020, retrieved from URL <https://en.wikipedia.org/wiki/Online_analytical_processing>. 14 pages.

Www2.microstrategy.com.[online], "MicroStrategy Intelligence Server," Apr. 2019, retrieved on Oct. 25, 2019, retrieved from URL <https://www2.microstrategy.com/producthelp/10.4/ProjectDesignGuide/WebHelp/Lang_1033/Content/ProjectDesign/MicroStrategy_Intelligence_Server.htm>.

U.S. Office Action in U.S. Appl. No. 16/542,058, dated Nov. 23, 2020, 18 pages.

Ma et al., "Efficient service handoff across edge servers via docker container migration author:," 2017, SEC '17: Proceedings of the Second ACM/IEEE Symposium on Edge Computing, 11:1-13.

Singh et al., "Container-based microservice architecture for cloud applications," May 2017, 2017 International Conference on Computing, Communication and Automation (ICCCA), 847-52.

U.S. Office Action in United States U.S. Appl. No. 16/541,763, dated Dec. 7, 2021, 18 pages.

U.S. Office Action in U.S. Appl. No. 16/542,023, dated Aug. 20, 2021, 14 pages.

U.S. Office Action in U.S. Appl. No. 16/542,023, dated Dec. 2, 2021, 6 pages.

Wong, "What's the Difference Between Containers and Virtual Machines?," Jul. 15, 2016, Electronic Design, retrieved from URL <http://electronicdesign.com/dev-tools/what-s-difference-between-containers-and-virtualmachines>, 3 pages.

Xu et al.; "Mining Container Image Repositories for Software Configuration and Beyond"; 2018 ACM/IEEE 40th International Conference on Software Engineering: New Ideas and Emerging Results—ICSE-NIER'18, May 27-Jun. 3, 2018, 6 pages.

Tao et al., "Dynamic Resource Allocation Algorithm for Container-based Service Computing"; 2017 IEEE 13th International Symposium on Autonomous Decentralized Systems—2017 IEEE, 62-7.

U.S. Office Action in U.S. Appl. No. 16/542,023, dated Mar. 12, 2021, 15 pages.

U.S. Notice of Allowance in U.S. Appl. No. 16/542,058, dated Apr. 12, 2021, 10 pages.

Office Action in U.S. Appl. No. 16/541,763, dated Apr. 26, 2022, 24 pages.

Buyya et al., "Cost-Efficient Orchestration of Containers in Clouds: A Vision, Architectural Elements, and Future Directions," Journal of Physics: Conference Series, Jul. 2018, 1108:1-13.

Office Action in U.S. Appl. No. 16/541,763, dated Nov. 4, 2022, 30 pages.

Brown et al., "A Model of Configuration Complexity and its Application to a Change Management System," 2005 9th IFIP/IEEE International Symposium on Integrated Network Management, 2005. IM 2005, 2005, 631-644.

Notice of Allowance in U.S. Appl. No. 17/377,994, dated Sep. 28, 2022, 12 pages.

Office Action in U.S. Appl. No. 17/665,119, dated Oct. 21, 2022, 13 pages.

\* cited by examiner

DEPLOYMENT OF CONTAINER-BASED COMPUTER ENVIRONMENTS

TECHNICAL FIELD

The present specification relates to container-based deployment for servers.

BACKGROUND

Traditionally, separate servers such as a database server, a document library server, a web server, and a collaboration server are used collectively to provide server functions.

SUMMARY

In some implementations, a system rapidly generates a container-based server environment in response to a single user action. For example, the system may generate a container-based server environment in response to a user selecting a server deployment option through a user interface.

The system can provide a fully automated mechanism to deploy a container-based server environment on cloud computing platforms. The system orchestrates initiation of containers on processing clusters. The system includes a service to build and verify newly generated server environments.

In some implementations, a client application can allow a client device to specify container images to pull from a repository in order to load appropriate containers and services provisioned within the containers. The client application can also allow the client device to provide application state data for customizing the containers of the server environment. Upon deploying the server environment, the system can automatically transfer, convert, and format the state data for container configuration.

The system includes multiple application programming interface (API) gateways for environment status checking and management. In addition to a standard cluster management API, the containers may each include a container API. The container APIs can enable communication between containers within the environment. The container APIs can also enable communication between individual containers and a client device. The container APIs can allow for fine-tuned individualized container configuration and management.

The system can enable a user to deploy a container-based server environment from any client device. The system allows for rapid deployment of a container-based server environment with little manual input. Additionally, the system allows for customized containers based on pre-existing environment data in any format.

In one general aspect, a method is performed by one or more computers. The method includes providing, by the one or more computers, data for a user interface. The user interface includes one or more user interface elements for initiating creation of a new container-based server environment; receiving, by the one or more computers, data indicating user interaction with the one or more user interface elements; in response to receiving the data indicating user interaction with the one or more user interface elements, creating, by the one or more computers, a new container-based server environment including multiple different containers hosted by a remote cluster of processing nodes, the multiple different containers being configured to provide different services that interoperate with each other; and providing, by the one or more computers, access to the new container-based server environment.

In some implementations, the new container-based server environment is generated based on a predetermined set of configuration information without receiving any user-specified operating parameters for the new container-based server environment.

In some implementations, the one or more user interface elements are a single user interface element. Interaction with the single user interface element causes the one or more computers to initiate creation of the multiple different containers of the new server environment without further interaction from the user.

In some implementations, the method includes, in response to receiving data indicating interaction with the one or more user interface elements, presenting a prompt having a control for receiving user input specifying an identifier for the new container-based server environment; and receiving, through the prompt, an identifier for the new container-based server environment. The new container-based server environment is created in response to receiving the identifier for the new container-based server environment.

In some implementations, providing access to the new container-based server environment includes indicating the new container-based server environment on a management interface and providing one or more tools to adjust configuration of the new container-based server environment; or operating the new container-based server environment to receive and respond to requests from one or more client devices.

In some implementations, creating the new container-based server environment includes accessing stored configuration data that (i) specifies a predetermined set of software images in a repository to use in generating new container-based server environments and (ii) indicates operations to initialize the containers generated using the predetermined set of software images.

In some implementations, creating the new container-based server environment includes retrieving, from the repository, each of the software images in the predetermined set of software images; generating a container on the cluster for each of the predetermined set of software images; and performing the operations indicated by the stored configuration data to initialize the containers. The operations configure the containers to communicate with each other through an application programming interface.

In some implementations, creating the new container-based server environment includes accessing a data set indicating characteristics of an installed instance of a software application; and configuring the multiple different containers to replicate the characteristics of the installed instance of the software application.

In some implementations, the data set includes metadata, one or more data cubes, and/or one or more data caches.

In some implementations, the data set is an archive or file system that indicates an application state of the application, and configuring the multiple different containers includes configuring the multiple different containers to have the same application state indicated by the archive or file system.

In some implementations, creating the new container-based server environment includes generating data structures configured to store state information for the multiple different containers in a manner that persists after the containers are stopped and unloaded.

In some implementations, the method includes receiving, using the one or more user interface elements, input to the user interface that indicates (i) a cluster of processing nodes, (ii) credential information for accessing the cluster, and (iii)

a data source indicating a previous installation of one or more software packages. Creating the new container-based server environment includes: running one or more executable or interpretable scripts; retrieving software images for the containers; loading the containers based on the software images; extracting data files of the one or more software packages from the data source; distributing copies of the extracted data files among the containers; and altering configuration information for the containers based on the extracted data files.

In some implementations, the cluster is a cluster of processing nodes of a remote cloud-computing-based server system operated by a third party.

In some implementations, the multiple different containers each implement a customized application programming interface layer for communicating among the containers.

In some implementations, the cluster provides a first management application programming interface (API) for control of the containers. The multiple different containers each implement a second management API for control of the containers, the second management API enabling communication with each of the multiple different containers over a network from a management application on a client device separate from management functionality provided by the cluster.

In some implementations, the cluster is a Kubernetes cluster.

In some implementations, the multiple different containers are configured to interoperate to provide online analytical processing (OLAP) capabilities to a plurality of remote client devices over a network.

In some implementations, the multiple different containers provide at least one of: multidimensional OLAP (MOLAP); relational OLAP (ROLAP); or hybrid OLAP that divides data between relational and specialized storage.

In some implementations, the multiple different containers include two or more of one or more containers configured to provide application server functionality including interaction with a database or data warehouse; one or more containers configured to provide web server functionality including serving content for interactive user interfaces to client devices over the Internet; one or more containers configured to provide collaboration server functionality; and one or more containers configured to provide library server functionality including generating or providing documents.

In some implementations, the multiple different containers are configured to interoperate to perform functions including receiving requests from remote client devices over a network; accessing data from one or more data sources; generating responses to the requests based on the accessed data; and providing the generated responses to the client devices over the network. The requests include requests for at least one of natural language query processing, structured query processing, document retrieval, report generation, visualization generation, or statistical analysis. The functions are divided among the multiple different containers.

Other embodiments of these and other aspects include systems, devices, and computer-readable media, which can be configured to cause the actions of the methods to be performed.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
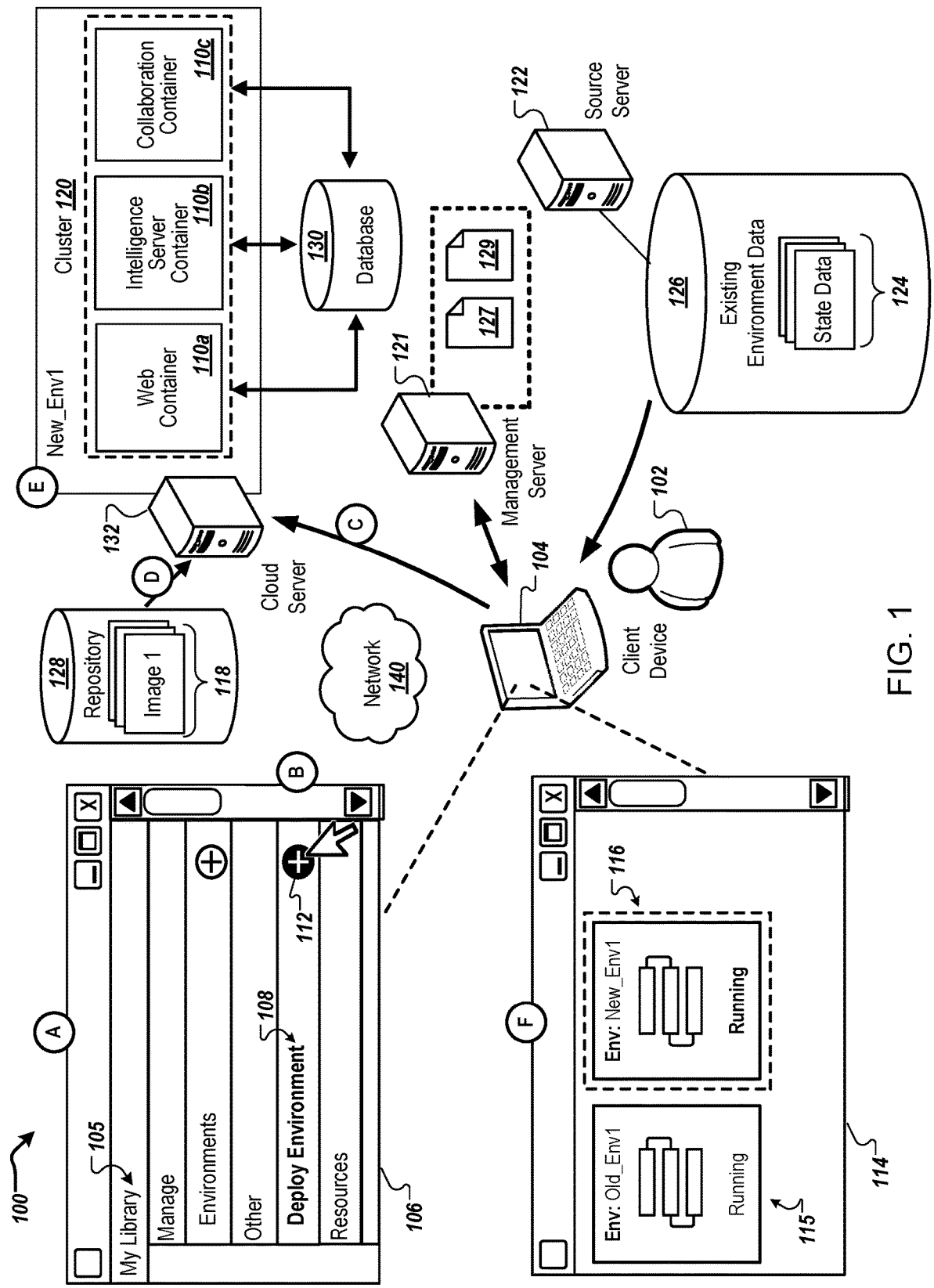
FIG. 1 is a diagram showing an example of a system for deploying a container-based server environment in response to a single user action.

In some implementations, a system generates a container-based server environment in response to a single user action. For example, the system may generate a container-based server environment in response to a user selecting a server deployment option through a user interface. In response to the user action, the system initiates the generation of containers on processing clusters within a new container-based server environment.

In some implementations, a computing system provides a server environment by running multiple software modules as containers that communicate with each other to provide services to clients. For example, software modules for different functions, applications, and/or services within the server environment may be executed as different containers, which can operate separately and independently of each other. One or more of the containers may provide front-end interfaces for client devices to interact with the server environment. One or more of the containers may provide back-end functions such as query processing, natural language processing, access control, authentication, database processing, etc. The containers in the cluster may be able to communicate with certain other containers within the cluster to fulfill user requests. For example, the arrangement may limit which containers may communicate with each other, as well as the nature of the communications, for example, using APIs to specify the types of interactions permitted.

A container-based server environment can provide various advantages in managing and upgrading the server environment. For example, containers can be dynamically started and stopped to balance load and manage resource usage. If one container experiences a high volume of traffic, another container for the same function can be started to help share the traffic. As another example, the use of containers can improve reliability. If one of the containers is terminated, crashes, or otherwise ends, other containers continue running and are unaffected. The system can create a new container with an instance of the same software as the container that was terminated. The system can track and store state data about containers, so that the operating state of a container can be recreated later. As another example, the use of containers can facilitate upgrades to portions of the server system with little or no downtime. While the server environment runs a first container with one version of a software module, the system can start running a second container with an upgraded version of the software module.

A container-based server environment can be configured to carry out various analytics functions. For example, a container-based environment can be used to implement a business intelligence (BI) system that manages databases and data sets, performs data analysis, generates visualizations of data, and generates reports and other documents. Other BI functions include online analytical processing, analytics, data mining, process mining, complex event processing, business performance management, benchmarking, text mining, predictive analytics, and prescriptive analytics.

In general, a software image may refer to a snapshot, or template, from which new containers can be started. In serving as a snapshot or template, a single software image can be used to deploy multiple containers, with each container running a different instance of the same software image. A software image may include all of the components necessary for running a container. These various components may include, for example, dependencies such as libraries and/or tools, code, a configuration file, one or more drivers, and/or settings. The software image may also contain references, pointers, or links to objects such as files outside of the software image and/or the corresponding container. A software image may be composed of a set of read-only layers. A software image may be modified, for example, by adding a new layer to the set of read-only layers. A software image may be associated with a particular application or function. Similarly, the components of a software image may be associated with a particular application or function.

In general, a container may refer to an encapsulated environment in which applications or functions, e.g., services, are run. A container can be defined by a software image and by a configuration file, though additional components and adjustments can be used in some implementations. A container is an instance of a software image and has access to the components of the software image.

In general, a cluster represents a set of processing nodes. The processing nodes may each represent physical hardware, such as processors, processor cores, or computers. The processing nodes may additionally or alternatively represent virtualized processing nodes, such as virtual CPUs that represent processing capabilities of a hardware platform but may not be mapped directly to specific hardware processors. Individual containers or groups of containers may be assigned to be run using specific processing nodes or groups of processing nodes. In some implementations, each container is assigned to and run by a different processing node in the cluster. In some implementations, multiple containers are grouped together to be executed by one or more processing nodes of the cluster. For example, a grouping such as a Kubernetes pod may include multiple containers that execute using the same processing node(s).

The techniques disclosed in this document can be used to more conveniently provide server functions. For example, a container-based or "containerized" server environment can perform a variety of different server functions without requiring separate servers such as a database server, a document library server, a web server, and a collaboration server. This can greatly streamline the management and maintenance of the server environment, while still providing the same or even more functionality than implementations with stand-alone servers. A container-based server environment also enables centralized management that simplifies the launch and updating of applications and functions.

The techniques disclosed in this document can be used to more efficiently provide server functions. Containers generally utilize fewer resources and less disk space than virtual machines. As a result, compared to stand-alone servers and virtualized servers, a container-based server environment can often provide equivalent performance with fewer hardware resources, or provide greater throughput and capacity using the same level of hardware resources.

Although virtual machines and containers both run on host machines, there are significant differences between them. Typically, a virtual machine is an instance of a distinct computer system including an operating system and any number of installed applications. The virtual machine uses emulation software that runs on a host system, usually a real hardware system although it can also be a virtual one. This is made possible either full virtualization or hardware-assisted virtualization, both providing the emulation layer required to run a guest operating system in full isolation. A typical virtual provides complete isolation in terms of having its own processes, networking, users, etc., which are separate from the host system and other guest systems that may be running alongside it.

Containers are typically instances of software that run on a host machine. Like virtual machines, containers can allow isolated processes, networking, users, etc. However, with containers, a guest operating system is not installed, and the container often includes only the application code needed for a single application. As a result, running the container runs the processes necessary for a particular application or service, without creating the overhead of a guest operating system. Containers can take advantage of the host operating system and layered file system, instead of requiring the emulation layer used to run virtual machines. Because a container doesn't require its own operating system, it uses fewer resources and consumes only the resources required for the application that is run upon starting the container.

In further detail, a virtualized system includes a host operating system and a hypervisor that runs on the host operating system. The hypervisor manages the various virtual machines, providing isolation between the virtual machines and the host operating system. The hypervisor can also provide emulation so each virtual machine can run as if it had direct access to the server hardware. Each virtual machine then includes a guest operating system, its own copy of any libraries or binaries needed, as well as applications run in the virtual machine. Each instance of a virtual machine thus runs its own operating system and its own applications and copies of supporting libraries.

By contrast with the virtualization approach, the container-based approach does not involve a hypervisor or emulation layer. The containers can run on the host operating system and the containers do not include guest operating systems. In some implementations, multiple containers (which may be multiple instances of the same software image) may share certain libraries, binaries, or other resources, which can further improve efficiency.

FIG. 1 is a diagram showing an example of a system 100 for deploying a container-based server environment in response to a single user action, e.g., one mouse click. The user can initiate a new container-based cloud environment with minimal input. The user can optionally supply additional input in order to initialize the new container-based cloud environment based on an existing environment.

The system 100 includes a cloud-computing server or "cloud server" 132, a repository 128 storing software images 118 for containers, and a client device 104 accessible by a user 102. The client device 104 can run a management application for managing server environments, and the application can optionally be supported by a management server 121. The functions of generating and managing server environments can be performed by the client device 104, the management server 121, or both. In some implementations, the system can be implemented with a client device 104 configured to orchestrate the creation of the new environment on its own. In other implementations, a management server 121 may provide data to the client device 104, such as the configuration data 127 and/or mapping data 129, and may even generate commands to the cloud server 132.

The system 100 includes a database 130. The client device 104 may communicate with the cloud server 132 over, for example, a network 140. The cloud server 132 may communicate with the database 130 over, for example, the network 140. The cloud server 132 may communicate with the repository 128 over, for example, the network 140.

The system 100 includes a source server 122 which may provide the source of configuration information about a previous or existing installation of software, e.g., an existing non-container-based server environment. The source server 122 can be a server maintained by the user 102. The source server 122 can be local or remote, or in some cases may be a cloud-computing server. The system 100 includes an existing environment database 126. The existing environment database 126 includes state data 124 for existing environments on the source server 122.

The client device 104 can be an electronic device such as a computing device. The client device 104 can be, for example, a desktop computer, a laptop computer, a smart phone, a cell phone, a tablet, a PDA, etc. The client device 104 is accessible by the user 102. The network 140 can include public and/or private networks and can include the Internet.

The repository 128 is a data storage containing a collection of software images 118. The collection of software images 118 can be a collection of software images. The collection of software images 118 may include various images for differing applications and functions, and/or various images of different versions of the same application or function. In some implementations, the repository 128 may be part of a cloud provider, e.g., a third-party server system, such as, for example, Docker Hub, Amazon Web Services (AWS), Microsoft Azure, or Google Cloud Platform (GCP).

In general, a software image, such as those included in the collection of software images 118, may refer to a snapshot, or template, from which new containers, e.g., containers 110a-110c, can be started. The software image can be a serialized copy of the entire state of an application or service stored in a non-volatile form, such as one or more files. Software images for containers of container-based environments generally exclude the operating system, but include the application or service, as well as supporting code libraries, dependencies, data sets, etc., that allow the application or service to run on an operating system of a host. The elements of the software image can be configured in a particular state. The software image, is then executable as a container on the operating system of a host system, e.g., a cluster of processing nodes.

In serving as a snapshot or template, a single software image can be used to deploy multiple containers, with each container running a different instance of the same software image. A software image may include all of the components necessary for running a container, e.g., running an independent instance of the application or service for which the software is stored in the software image. These various components may include, for example, dependencies such as libraries and/or tools, code, a configuration file, one or more drivers, and/or settings. The software image may also contain references, pointers, or links to objects such as files outside of the software image and/or the corresponding container. Software images often define an internal file system structure, e.g., with various files organized in folders or directories, so that components of the software image can reference and access each other in a predictable manner. A software image may be composed of a set of read-only layers. A software image may be modified, for example, by adding a new layer to the set of read-only layers. A software image may be associated with a particular application or function. Similarly, the components of a software image may be associated with a particular application or function.

The cloud server 132 is a server system and can include one or more computing devices. In some implementations, the cloud server 132 may be part of a cloud provider, e.g., a third-party server system, such as, for example, Amazon Web Services (AWS), Microsoft Azure, or Google Cloud Platform (GCP).

In general, a container may refer to an encapsulated environment in which applications or functions, e.g., services, are run. A container is defined by a software image and by a configuration file. A container is an instance of a software image and has access to the components of the software image. Using containers, the system 100 can run multiple instances of the same software image within different containers.

In general, a cluster represents a set of processing nodes. The processing nodes may each represent physical hardware, such as processors, processor cores, or computers. The processing nodes may additionally or alternatively represent virtualized processing nodes, such as virtual CPUs that represent processing capabilities of a hardware platform but may not be mapped directly to specific hardware processors. Individual containers or groups of containers may be assigned to be run using specific processing nodes or groups of processing nodes. In some implementations, each container is assigned to and run by a different processing node in the cluster. In some implementations, multiple containers are grouped together to be executed by one or more processing nodes of the cluster. For example, a grouping such as a Kubernetes pod may include multiple containers that execute using the same processing node(s).

A container-based or "containerized" server environment can include a variety of different server functions without requiring separate servers such as a database server, a document library server, a web server, and a collaboration server. This can greatly streamline the management and maintenance of the server environment, while still providing the same or even more functionality than implementations with stand-alone servers. A container-based server environment also enables centralized management that simplifies the launch and updating of applications and functions.

Containers generally utilize fewer resources and less disk space than virtual machines. As a result, compared to stand-alone servers and virtualized servers, a container-based server environment can often provide equivalent performance with fewer hardware resources, or provide greater throughput and capacity using the same level of hardware resources.

Containers are typically instances of software that run on a host machine. Like virtual machines, containers can allow isolated processes, networking, users, etc. However, with containers, a guest operating system is not installed, and the container often includes only the application code needed for a single application. As a result, running the container runs the processes necessary for a particular application or service, without creating the overhead of a guest operating system. Containers can take advantage of the host operating system and layered file system, instead of requiring the emulation layer used to run virtual machines. Because a container doesn't require its own operating system, it uses fewer resources and consumes only the resources required for the application that is run upon starting the container. The containers 110 can each run an instance of a software image 118. The software image 118 is associated with a specific application or function such as, for example, a server service. Accordingly, the container 110, when deployed, is running the specific application or function associated with the software image 118. The containers 110 can represent instances of applications and/or services that together represent a server environment. For example, the server environment can provide analytics services (e.g., querying, reporting, database access, OLAP, etc.) to various client devices.

FIG. 1 also illustrates various events, shown as stages (A) to (F), with each representing a step in an example process for deploying new container instances. Stages (A) to (F) may occur in the illustrated sequence, or in a sequence that is different from the illustrated sequence. For example, some of the stages may occur concurrently.

In stage (A) of FIG. 1, the system 100 provides a user interface 106 to the user 102 via the client device 104. The user interface 106 can include a library 105 of tools that can provide information about monitored computing environments. The user interface 106 can also enable the user to provide input specifying changes to make to configurations. The user interface 106 can be provided as an application, dashboard, web page, web application, API, etc.

The user interface 106 can include a single user interface element for initiating creation of a new container-based server environment. Interaction with the single user interface element can cause the one or more computers to initiate creation of multiple different containers of the new server environment without further interaction from the user. For example, the user interface 106 includes a single user interface element, button 112, associated with a label "Deploy Environment" 108.

In stage (B) of FIG. 1, the user 102 performs a user action to initiate deployment of a new container-based environment. The user 102 selects the user interface element, button 112, associated with the label "Deploy Environment" 108, e.g., by clicking on the button 112 using a computer mouse.

In some implementations, upon selecting the button 112, the system 100 can deploy the new container-based environment without any additional user input. In this situation, the new container-based server environment is generated based on a predetermined set of configuration information. Thus, the new container-based server environment can be generated without receiving any user-specified operating parameters for the new container-based server environment.

In some implementations, the system 100 allows the user to customize various aspects of the computer environment. In response to receiving data indicating interaction with the one or more user interface elements, presenting a prompt having a control for receiving user input specifying an identifier for the new container-based server environment. Through the prompt, the client device 104 can receive an identifier for the new container-based server environment. For example, the user 102 may enter an identifier, e.g., a name, for the new container-based environment. In the example of FIG. 1, the user 102 assigns a name "New_Env1" to the new container-based environment. The new container-based server environment may be created in response to receiving the identifier for the new container-based server environment.

In some implementations, upon selecting the button 112 or along with the button 112, the user 102 is presented with one or more additional prompts or options for configuring the new container-based environment. Additional options that can optionally be presented to the user 102 are described with reference to FIG. 3.

In stage (C) of FIG. 1, in response to receiving the data indicating that the user 102 selected the button 112, the client device 104 sends an instruction to the cloud server 132 to deploy the new container-based environment New_Env1. The client device 104 can send instructions to generate the container-based environment New_Env1, including multiple different containers, e.g., containers 110, hosted by a remote cluster of processing nodes, e.g., cluster 120. The cluster 120 may be a cluster of processing nodes of a remote cloud-computing-based server system operated by a third party. The cluster 120 is configured to provide different services, e.g., through containers 110-110c, that interoperate with each other. In some implementations, the cluster 120 is a Kubernetes cluster.

In the system 100, the user 102 is not required to identify or specify the specific images 118 or containers to be deployed in the new environment. Rather, the management application on the client device 104 and/or the management server 121 can automatically select a set of software images 118 that will interoperate to provide the server environment features needed. In some implementations, the management server 121 or another component of the system 100 stores configuration data 127 that specifies a predetermined set of container software images 118 that are designed to operate together in a complementary way. For example, there may be a set of three, five, ten, or more different images 118 in a predetermined set that provide different complementary services and are configured to communicate with each other once deployed. When the user selects the button 112, this (alone or in combination with other inputs) can trigger the client device 104 to initiate create the new container-based environment based on the predetermined set of container software images 118 that together provide the server platform (e.g., a web server container, a data analysis container, a query processing container, and so on). The management server 121 or the client device 104 can identify the specific software images 118 to be loaded, as specified in the stored configuration data.

As another example, the management server 121 and/or client device 104 can examine the characteristics of the existing environment 115 (e.g., based on the state data 124) and determine which container software images 118 are needed to replicate the functionality of the environment 115. This can include accessing mapping data 129 that associates functions, files, modules, settings, applications, services and/or other aspects of an environment with corresponding container software images 118. Thus, the mapping data 129 can be used to look up the container software images 118 needed to replicate the functionality of the environment 115. As another example, the type or version of software used in the environment 115 can be identified, and the configuration data 127 can store data indicating different sets of the container software images 118 to be used to create a corresponding container-based environment. For example, one type of server environment may be replicated with a set of 10 containers, a different type of server environment may be replicated with a different set of 10 containers or a set of 15 containers, and so on.

Once the appropriate containers are identified and loaded, additional configuration information can be transferred, e.g., from state data 124 that indicates the settings and customizations used for the source server 122. These customizations can include, for example, cache sizes, metadata repositories, user lists, security and access policies, connections to data sources, report templates, and more. Creating the new container-based server environment can include configuring the multiple different containers to replicate the characteristics of the installed instance of the software application, e.g., the characteristics of one or more applications installed on the source server 122 or another server. Configuring the multiple different containers can include configuring the multiple different containers to have the same application state indicated by the state data 124.

Creating the new container-based server environment can include accessing a data set indicating characteristics of an installed instance of a software application. For example, the user 102 can identify a selection of data from an existing server installation to upload to the new container-based environment New_Env1. For example, the source server 122 can include an existing environment database 126 with the data set, e.g., state data 124. The state data 124 can be an archive or file system that indicates an application state of the application. The state data 124 can include, for example, data cubes, data caches, and metadata. The user 102 can upload the state data 124 to the cloud server 132, e.g., as a ZIP file. The ZIP file can include the state data 124 from the existing environment database 126 environment as it is, with no configuration or conversion necessary.

Creating the new container-based server environment can include accessing stored configuration data. The stored configuration data may specify a predetermined set of software images 118 in a repository 128 to use in generating new container-based server environments. The stored configuration data may also indicate operations to initialize the containers generated using the predetermined set of software images.

Creating the new container-based server environment can include retrieving, from the repository 128, each of the software images in the predetermined set of software images. For example, in stage (D) of FIG. 1, the cloud server 132 retrieves software images 118 from the repository 128. The software images 118 can be software images from which new containers can be generated. The software images 118 can be customized with the state data 124 to generate containers for the new container-based environment New_Env1. In some implementations, the user 102 may specify software images 118 to pull from the repository 128 in order to load appropriate containers 110 and services provisioned within the containers 110.

Creating the new container-based server environment can include running one or more executable or interpretable scripts and retrieving software images 118 for the containers 110. Creating the new server environment can also include loading the containers 110 based on the software images 118, and extracting data files of the one or more software packages from a data source, e.g., the existing environment database 126. Creating the new server environment can include distributing copies of the extracted data files among the containers 110, and altering configuration information for the containers 110 based on the extracted data files.

In some implementations, the cloud server 132 can generate a container on the cluster 120 for each of the predetermined set of software images 118. For example, when a software image 118 is provided to the cloud server 132, the cloud server 132 loads the software image 118. This can involve creating a new container, loading the contents of the software image 118, and starting the container so that the software in the loaded software image 118 is executed. This process can also make a filesystem specified in the software image 118 available by the software running in the container. In general, a container can provide an application, a service, a software module, or a server function.

In stage (E) of FIG. 1, the cloud server 132 deploys the new container-based environment New_Env1, including a number of interrelated containers 110a-110c that run on a cluster 120 of processing nodes. Creating the new container-based server environment can include generating data structures configured to store state information for the multiple different containers in a manner that persists after the containers are stopped and unloaded.

The multiple different containers may include one or more containers configured to provide application server functionality including interaction with a database or data warehouse. The containers may include one or more containers configured to provide web server functionality including serving content for interactive user interfaces to client devices over the Internet. The containers may also include one or more containers configured to provide collaboration server functionality, and one or more containers configured to provide library server functionality including generating or providing documents.

For example, the environment New_Env1 includes a web container 110a, an intelligence server container 110b, and a collaboration container 110c. The web container 110a may provide a front-end interface that can interact with the client device 104 to provide BI reporting, analysis, and/or monitoring. The intelligence server container 110b may provide an analytics and/or BI platform. The collaboration container 110c may allow the user 102 of the client device 104 to access shared content, to search through documents or reports, to share content, to interact with other users, to monitor other users, to monitor other users' actions, etc.

The multiple different containers may be configured to interoperate to provide online analytical processing (OLAP) capabilities to remote client devices, e.g., the client device 104, over a network, e.g., the network 140. The multiple different containers may provide one or more of multidimensional OLAP (MOLAP), relational OLAP (ROLAP), or hybrid OLAP that divides data between relational and specialized storage.

The multiple different containers may be configured to interoperate to perform functions including receiving requests from remote client devices over a network, accessing data from one or more data sources, generating responses to the requests based on the accessed data, and providing the generated responses to the client devices over the network. The requests may include requests for, e.g., natural language query processing, structured query processing, document retrieval, report generation, visualization generation, or statistical analysis. The functions may be divided among the multiple different containers.

In some implementations, the cloud server 132 generates a predetermined set of multiple containers 110 for each new container-based environment. For example, the cloud server 132 may generate a standard set or default set of 8, 10, or 12 containers for each new container-based environment.

In some implementations, the ability to rapidly deploy a server environment is enhanced by having software images 118 defined in advance to represent the predetermined set of containers 110, with the software images 118 already configured to interoperate once loaded as containers. In addition, initialization scripts and other operations can be defined in advance, so that little or no user input is needed to define the operating parameters of the new server environment. The stored information can be used as a template to generate new server environments. As a result, when a user indicates that a new server environment is desired, the system can automatically generate a fully-functional collection of interoperating containers based on the stored information, without requiring any configuration from the user. Of course, the collection of containers can be further customized by a user if desired. In some implementations, as discussed below, the collection of containers is automatically configured with configuration information and application state information transferred from an archive or previous installation of software.

The containers 110 can be configurable to the individual environment. For example, the cloud server 132 can configure the containers 110 based on the state data 124 provided by the source server 122. The cloud server 132 can configure the containers 110 by configuring a set of scripts to copy the state data 124 to the new container-based environment New_Env1. The cloud server 132 can also translate and/or modify the state data 124 for a particular environment and/or for a particular container. For example, the cloud server 132 may convert the state data 124 to a common data standard for input to the containers 110.

Data migration to the new container-based environment New_Env1 can be performed in a short amount of time, e.g., one hour or less than one hour. Once the new container-based environment New_Env1 has been deployed, the new container-based environment New_Env1 includes the cluster 120 of processing nodes that execute the network-integrated containers 110a-110c.

The containers 110a-110c are customized for the individual installation. The containers 110a-110c are configured to communicate with each other and with the client device 104, for example, through container APIs. The containers 110a-110c can be configured to send data to, receive data from, and/or communicate with external data stores and/or databases, e.g., the database 130.

In order to manage the containers 110a-110c, the system 100 may leverage one or more container engines or technologies such as, for example, Docker and/or CoreOS rkt. In order to arrange the containers to perform a variety of different server functions, the system 100 may leverage one or more container orchestration engines (COEs) such as, for example, Kubernetes, Mesos, and/or Docker Swarm. These technologies can automate various functions such as creating new containers, initializing or restoring state of the containers, starting execution of containers, monitoring containers, stopping execution of containers, and removing stopped containers from the server environment.

In stage (F) of FIG. 1, the system 100 provides a user interface 114 to the user 102 via the client device 104. The user interface 114 can include a desktop display that can provide information about monitored computing environments.

With the new cloud-based environment 116 created and running, the system provides access to the new environment 116. Providing access to the new container-based server environment 116 can include indicating the new container-based server environment on a management interface. Providing the new environment can include providing one or more tools to adjust configuration of the new environment 116, or operating the new container-based server environment to receive and respond to requests from one or more client devices. Providing access to the environment 116 can also include assigning devices or users to communicate with the new environment 116, which can be done automatically (e.g., as part of load balancing or automatic management) or manually in response to user input to a management interface. Providing access to the environment 116 can include routing requests to the new environment 116.

The user interface 114 can display a status of running environments. For example, the user interface 114 can provide an icon 115 representing a status of a pre-existing container-based environment Old_Env1. The user interface 114 can also provide an icon representing a status of the new container-based environment New_Env1.

While the cloud server 132 is initializing the new container-based environment New_Env1, the user interface 114 can display a symbol or text within the icon 116 indicating that the deployment is in process. When the cloud server 132 completes generating the containers 110-110c, the user interface 114 can display a symbol or text within the icon 116 indicating that the deployment is complete. For example, the user interface 114 can display the text "Running" within the icon 116 to indicate that the new container-based environment New_Env1 is running.

Figure 2:
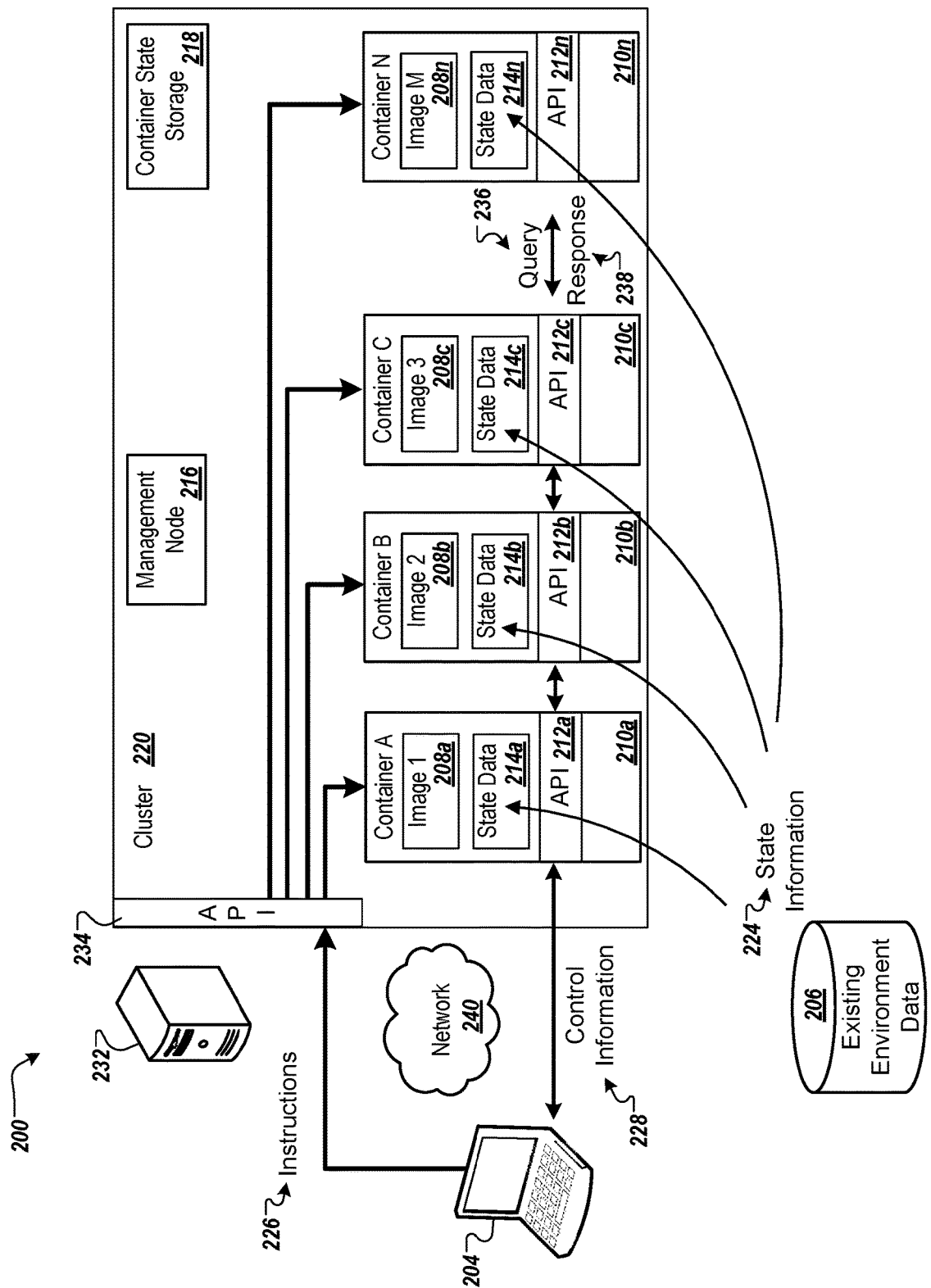
FIG. 2 is another diagram showing an example of a system deploying a container-based server environment in response to a single user action.

FIG. 2 is another diagram showing an example of a system 200 deploying a container-based server environment in response to a single user action.

The system 200 includes a cloud server 232 and a client device 204. The client device 204 may communicate with the cloud server 232 over, for example, a network 240. The system 200 also includes an existing environment database 206. The existing environment database 206 includes state information 224 for existing environments.

The cloud server 232 is a server system and can include one or more computing devices. In some implementations, the cloud server 232 is located on the premises of a customer, e.g., on-premises. In other implementations, the cloud server 232 is not located on the premise of a customer, e.g., off-premises. In these implementations, the cloud server 232 may be part of a cloud provider, e.g., a third-party server system, such as, for example, Amazon Web Services (AWS), Microsoft Azure, or Google Cloud Platform (GCP).

The client device 204 can be an electronic device such as a computing device. The client device 204 can be, for example, a desktop computer, a laptop computer, a smart phone, a cell phone, a tablet, a PDA, etc. The network 240 can include public and/or private networks and can include the Internet.

Upon receiving an instruction to deploy a new container-based environment, the cloud server 232 can generate the new container-based environment, including cluster 220 with processing nodes running containers 210. The container-based environment can include any number "n" of containers 210a-210n. The cloud server 232 can configure the containers 210a-210n with state information 224 from the existing environment database 206. During initial configuration, the state information 224 can be transferred, formatted, and inserted into each container 210 as state data 214.

The container-based environment includes containers 210a-210n, images 208a-208n, state data 214a-214n, APIs 212a-212n, management node 216, and container state storage 218. The container-based environment may include other components that are not shown, such as additional containers, files containing deployment instructions for the container-based environment, etc.

The container-based environment includes the management node 216. The management node 216 controls and manages the cluster 220. The management node 216 can perform management functions, e.g., starting and stopping containers, assigning software images to processing nodes, balancing loads, etc.

Upon deployment, the container-based server environment includes containers 210a-210n running on the cluster 220 of processing nodes provided by the cloud server 232.

The variety of containers may include containers for applications and/or functions related to BI. These BI containers may include, for example, a web container, an intelligence server container, and a collaboration container.

The containers 210 can each run an instance of an image 208. The image 208 is associated with a specific application or function such as, for example, a server service. Accordingly, the container 210a, when deployed, is running the specific application or function associated with the image 208a. The containers 210 can represent instances of applications and/or services that together represent a container-based environment. For example, the container-based environment can provide analytics services (e.g., querying, reporting, database access, OLAP, etc.) to the client device 204.

Each container 210a-210n runs an instance of a software image, which may be referred to as a container image. The software image includes the executable code for an application or service, as well as dependencies for the application or service. However, the software image for a container does not include an operating system.

Each of containers 210a-210n has a corresponding set of state data 214a-214n. The state data 214a-214n represents the current state of each container 210a-210n, may include, for example, session-based state data. In some implementations, the state data 214 includes data in addition to session-based state data such as, for example, environment-based state data. During the deployment of the container-based environment, data from each container 210a-210n may be added to the respective state data 214a-214n.

The container-based environment includes container state storage 218. The container state storage 218 can store the state data 214 for the containers 210. Once the containers 210 are running, the state data 214 is stored in the container state storage 218. As the containers 210 continue to run, the state data 214 changes over time. Changes to the state data 214 are also stored in the container state storage 218.

Because the container state storage 218 stores the state data 214, the containers 210 are persistent containers. Similarly, the state data 214 is persistent data. Each of the containers 210a-210n can therefore be stopped and started without losing or resetting the state data 214a-214n.

The cluster 220 provides a first management API 234 for control of the cluster 220 and the containers running on the cluster. The client device 204 can interact with the container-based environment through the management API 234. The management API 234 can provide control to the containers 210 through the cluster 220. The client device 204 can communicate with the management API 234, e.g., to send instructions 226 for managing the container-based environment. For example, the client device 204 can send instructions 226 to the management API 234 to start running, to stop running, and/or to configure of one or more containers 210. Upon receiving instructions 226 through the API, the management node 216 can implement the instructions 226 in managing the containers 210.

In some implementations, the management node 216 can resize the cluster 220, e.g., by scaling up or scaling down the size of the cluster 220. For example, in response to instructions 226 from the client device 204, the management node 216 may resize the cluster 220. In some implementations, the management node 216 may resize the cluster 220 based on operational and/or load requirements.

Upon generating the containers 210a-210n, the cloud server 132 may perform the operations indicated by the stored configuration data to initialize the containers 210a-210n. The operations can configure the containers 210a-210n to communicate with each other through an API. The multiple different containers may each implement a customized API layer for communicating among the containers.

The multiple different containers each implement the second management API 212, or container API 212, for control of the containers 210. The second management API 212 can enable communication with each of the multiple different containers. The multiple different containers can communicate over the network 240 from a management application on the client device 204 separate from management functionality provided by the cluster 220.

For example, the containers 210a-210n each include a respective container API 212a-212n. The container APIs 212 enable the containers 210 to communicate with each other and with the management API 234 within the container-based environment. The container APIs 212 also enable the containers to communicate with the client device 204. For example, the container APIs 212 can each receive control information 228 from the client device 204. The control information 228 may be specific to an individual container, e.g., the container 210a.

The container APIs 212 can enable management and communication between the containers 210. For example, the container API 212c may send a query 236 to the container 210n via the container API 212n. The container API 212n may then send a response 238 to the container 210c via the container API 212c. In some implementations, the query 236 and the response 238 may be related to a status of the container 210n.

In some implementations, the container APIs 212 can transfer application state data 214 between the containers 210. For example, the container API 212b may transfer state data 214b to the container 210c via the container API 212c.

Figure 3:
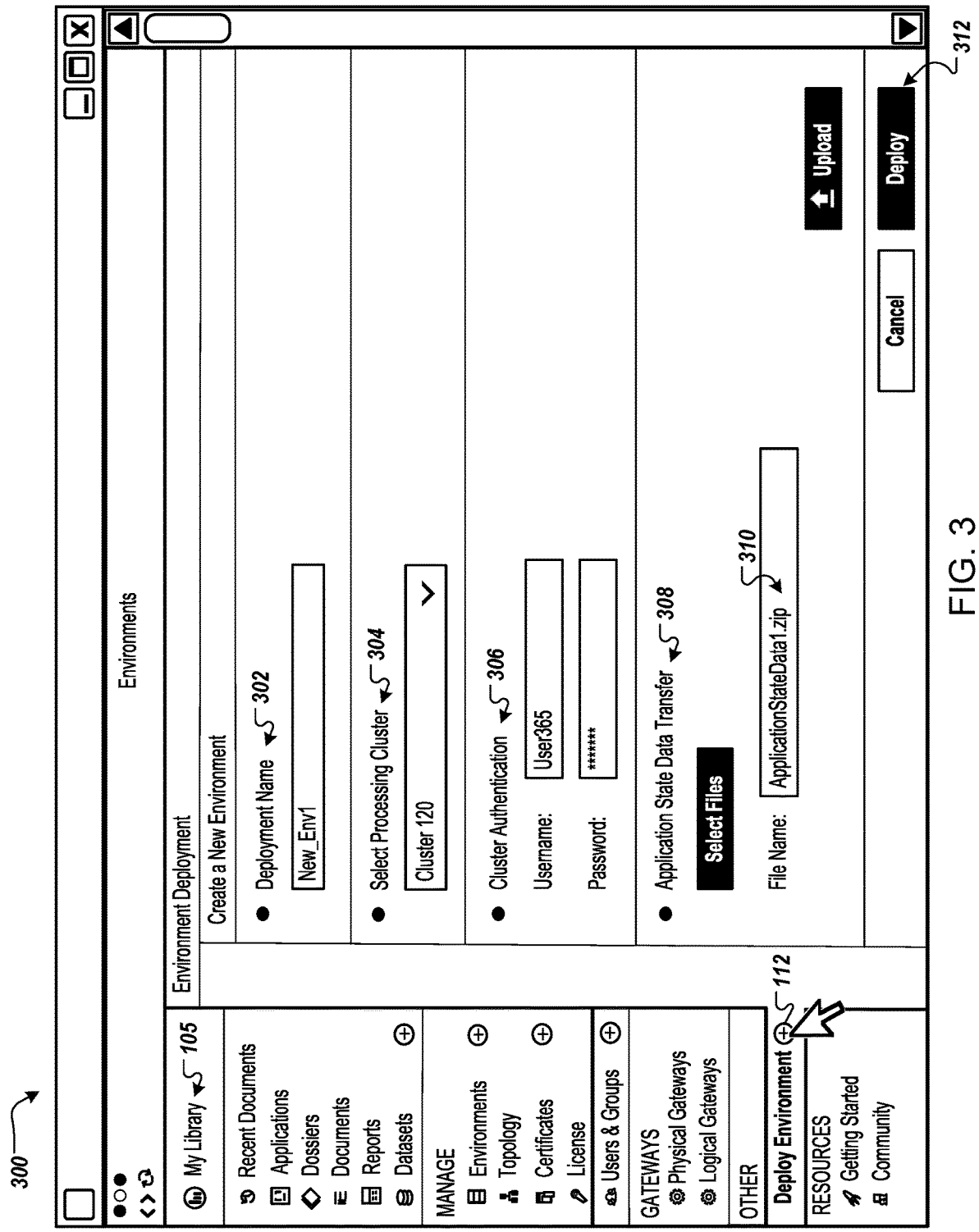
FIG. 3 is a diagram illustrating an example user interface for deploying a container-based server environment.

FIG. 3 is a diagram illustrating an example user interface 300 for deploying a container-based server environment. The interface 300 can be provided through a client application that allows a client device (e.g., the client device 104 as shown in FIG. 1) to specify settings for the container-based environment. The interface 300 may be provided to the client device for display to and/or modification by a user (e.g., the user 102 as shown in FIG. 1). The interface 300 includes one or more user interface elements that can provide options for configurations and settings for creating a new environment.

The interface 300 includes the library 105. The library 105 includes an option labeled "Deploy Environment." In FIG. 3, a user has selected the button 112 associated with the "Deploy Environment" option using a computer mouse.

In some implementations, upon selecting "Deploy Environment," a system, e.g., the system 100, can automatically deploy a container-based environment with no additional user action. In some implementations, the system 100 can provide the user with additional options for configuring the new container-based environment. The interface 300 displays example additional options that may be presented to the user. Through the interface 300, the one or more computers can receive input that indicates a cluster 304 of processing nodes, credential information, e.g., authentication information 306, for accessing the cluster, and a data source, e.g., a file 310, indicating a previous installation of one or more software packages.

The interface 300 includes a menu of options for the user. The menu includes an option to enter a deployment name 302, to select the processing cluster 304, to enter cluster authentication information 306, and to select files for application state data transfer 308.

The user can enter an identifier for the new environment, e.g., a deployment name 302. The deployment name 302 is a name selected by the user that is unique to the new container-based environment. In the example of FIG. 3, the user enters a deployment name "New_Env1."

The user can select a processing cluster 304. The user may select the processing cluster 304, e.g., using a drop-down menu. The processing cluster can be a cluster of processing nodes of an existing environment on a local server (e.g., the source server 122 as shown in FIG. 1). In the example of FIG. 3, the user selects the processing cluster 120.

The user can enter cluster authentication information 306. The cluster authentication can include credential information, e.g., a username and password for accessing the cluster 120. The cluster authentication can be a preset authentication associated with a user and/or client account.

The user can select a data source for application state data transfer 308. The user can select one or more files, e.g., a file 310, which may be a ZIP file or other archive of multiple files. The file 310 can indicate a previous installation of one or more software packages. The file 310 can include state data for cluster 120. The state data can include, for example, data caches, data cubes, and metadata for cluster 120. The user can upload the file 310 to the cloud server 132. Upon deployment, the cloud server 132 can carry over the state data from the file 310 to the new container-based environment New_Env1.

Once the user has selected options and settings for New_Env1, the user can select to deploy 312 the new environment. The system, e.g., the system 100, can then initiate deployment of the new container-based environment New_Env1, as described with reference to FIGS. 1 and 2.

Figure 4:
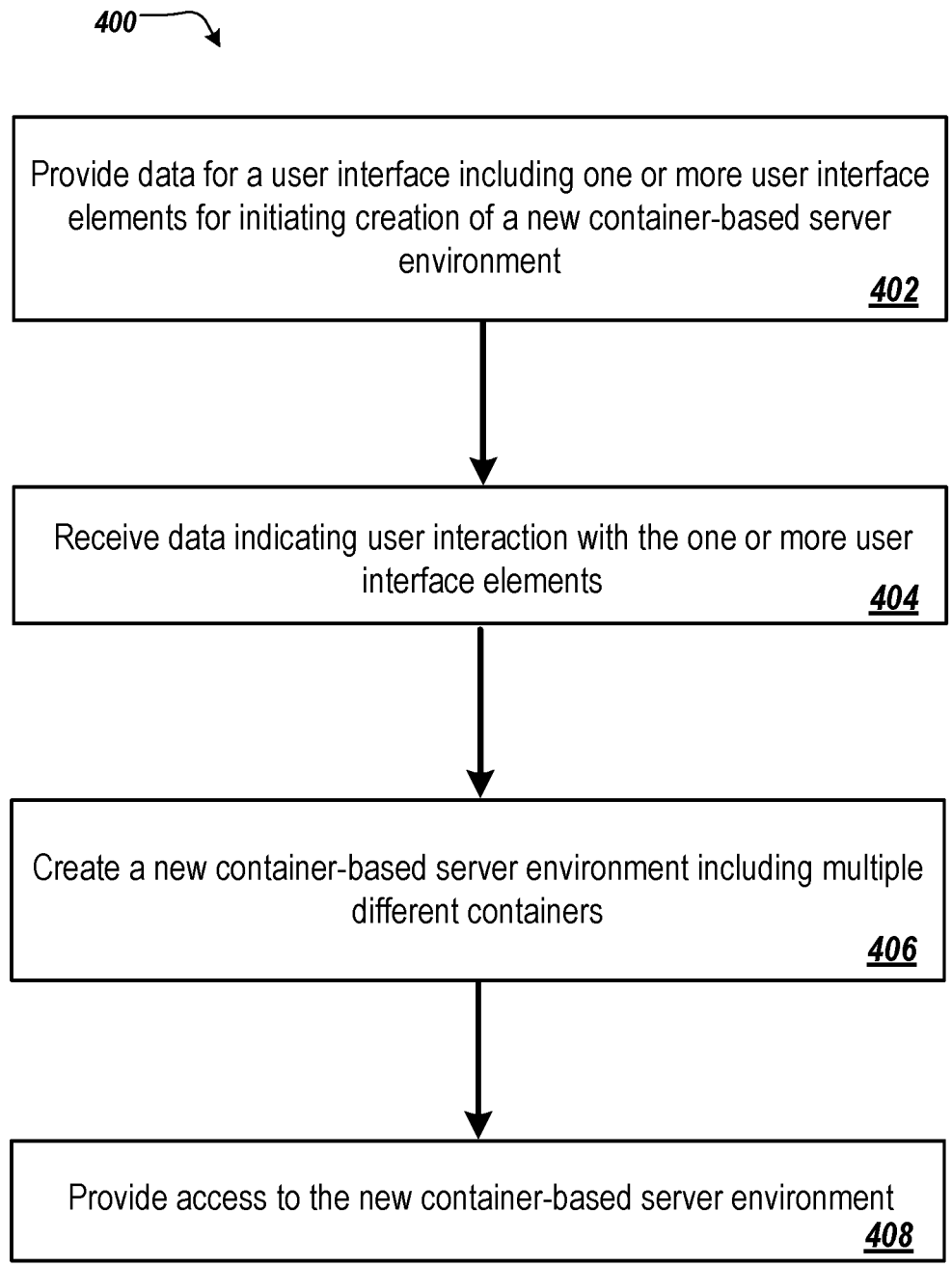
FIG. 4 is a flow diagram showing an example of a process for deploying a container-based server environment.

FIG. 4 is a flow diagram showing an example of a process 400 for deploying a container-based server environment. The process 400 can be performed by one or more computers, e.g., the client device 104 and/or the management server 121 of FIG. 1.

Among the potential advantages of the process 400 is the option for a user to create and deploy a fully functional server environment, with configuration data from an existing server environment imported, in just a few clicks or taps of a user interface. The process can use a predetermined set of container images that provide different services, with the container images being configured to interoperate and communicate. With an indication of a data source for an existing software installation, e.g., an archive file, a file system, or the server environment itself, the process 400 can copy data files, settings, metadata, data cubes, caches, and more to the appropriate locations in the various containers. This can preserve the application state and configuration of the existing software installation, without requiring the user to transfer the information.

The process 400 includes providing data for a user interface including one or more user interface elements for initiating creation of a new container-based server environment (402).

In some implementations, the one or more user interface elements are a single user interface element, where interaction with the single user interface element causes the one or more computers to initiate creation of the multiple different containers of the new server environment without further interaction from the user.

In some implementations, the one or more computers provide a field or prompt for the user to input additional information about the environment to be generated. The one or more user interface elements can enable entry of information such as: an indication of a cluster of processing nodes to use; credential information for a cluster; an indication of a computing environment, server, or archive to use as a source for configuration information; etc.

For example, the one or more user interface elements can receive input to the user interface that indicates (i) a cluster of processing nodes, (ii) credential information for accessing the cluster, and (iii) a data source indicating a previous installation of one or more software packages.

The process 400 includes receiving data indicating user interaction with the one or more user interface elements (404). For example, the user may simply select a control to create a new environment or migrate an existing environment to a container-based implementation.

In some implementations, in response to receiving data indicating interaction with the one or more user interface elements, the one or more computers can present a prompt having a control for receiving user input specifying an identifier for the new container-based server environment. Through the prompt, an identifier for the new container-based server environment can be received. The new container-based server environment can be created in response to receiving the identifier for the new container-based server environment. Other information can be requested and obtained, such as: an indication of a cluster of processing nodes to use; credential information for a cluster; an indication of a computing environment, server, or archive to use as a source for configuration information; etc.

The process 400 includes creating a new container-based server environment including multiple different containers hosted by a remote cluster of processing nodes (406). The multiple different containers can be configured to provide different services that interoperate with each other. The cluster may be a cluster of processing nodes of a remote cloud-computing-based server system operated by a third party. The cluster may be a local or remote cluster of processing nodes. In some implementations, the cluster is a Kubernetes cluster.

In some implementations, the new container-based server environment is generated based on a predetermined set of configuration information without receiving any user-specified operating parameters for the new container-based server environment. The configuration information can identify a specific set of containers to be loaded, for example, a predetermined set of container software images to be loaded to operate together as a server platform. This can provide a significant benefit in the speed of generating a new platform, since the container images and initialization scripts can be present already. It also reduces the requirements for a user to initiate a new environment, because the user need not select specific containers or ensure interoperability of them.

The configuration information can also include initialization information to set parameters of the containers, establish communication between containers, and perform other tasks to start the container-based environment. When creating the new environment, the one or more computers can access stored configuration data that (i) specifies a predetermined set of software images in a repository to use in generating new container-based server environments and (ii) indicates operations to initialize the containers generated using the predetermined set of software images.

As part of creating the new container-based server environment, the one or more computers can retrieve, from a repository, each of the software images in the predetermined set of software images. The one or more computers can then generate a container on the cluster for each of the predetermined set of software images. The one or more computers can perform the operations indicated by the stored configuration data to initialize the containers. The operations can configure the containers to communicate with each other through an application programming interface.

Creating the new container-based server environment can include accessing a data set indicating characteristics of an installed instance of a software application or server environment, e.g., a non-container-based installation. The multiple different containers can then be automatically configured, by the one or more computers, to replicate the characteristics of the installed instance of the software application. This can involve sending instructions to a cloud-computing system or other host of the containers to make configuration changes and to transfer data to the containers. The data set comprises metadata, one or more data cubes, and/or one or more data caches. In some implementations, the data set is an archive or file system that indicates an application state of the application. Similarly, the state of a service or server environment can be indicated. Configuring the multiple different containers can include configuring the multiple different containers to recreate or approximate the same application state indicated by the archive or file system.

Creating the new container-based server environment can include generating data structures configured to store state information for the multiple different containers in a manner that persists after the containers are stopped and unloaded. Thus, when some or all of the containers of the new container-based server environment are stopped or unloaded, they can be re-loaded and re-started to continue with the configuration and operating state they were configured to have.

In some implementations, creating the new container-based server environment includes: running one or more executable or interpretable scripts; retrieving software images for the containers; loading the containers based on the software images; extracting data files of the one or more software packages from the data source; distributing copies of the extracted data files among the containers; and altering configuration information for the containers based on the extracted data files. In this manner, the one or more computers can automatically replicate the functionality of one server environment in a container-based environment with minimal user involvement required. In many instances, the new container-based environment is created to be compatible with the prior environment, and can be directly assigned to handle tasks that would have been routed to the prior installation.

The process 400 includes providing access to the new container-based server environment (408). As an example, this can include indicating the new container-based server environment on a management interface and providing one or more tools to adjust configuration of the new container-based server environment. As another example, this can include operating the new container-based server environment to receive and respond to requests from one or more client devices. As another example, this can include assigning users or devices to communicate with the new container-based server environment, or providing a user interface enabling a user to specify which devices or users to assign.

In some implementations, the multiple different containers each implement a customized application programming interface (API) layer for communicating among the containers. This can be a management API layer that is different from the one used by or provided by the cluster. For example, the cluster can provide a first management application programming interface (API) for control of the containers. The multiple different containers each implement a second management API for control of the containers, the second management API enabling communication with each of the multiple different containers over a network from a management application on a client device separate from management functionality provided by the cluster. In some implementations, the second API is a wrapper or extension of another API, such as a kubernetes API. The second API can enable the containers to communicate with each other and with an outside system, such as a management application of client device.

In some implementations, the multiple different containers are configured to interoperate to provide online analytical processing (OLAP) capabilities to a plurality of remote client devices over a network. For example, the multiple different containers can be configured to provide at least one of: multidimensional OLAP (MOLAP); relational OLAP (ROLAP); or hybrid OLAP that divides data between relational and specialized storage. The stored configuration data can define the set of containers that are designed to interoperate to provide these features.

The set of containers can provide a variety of functions, such as an application service to interaction with a database or data warehouse, a web service to provide user interface data and web or Internet communications, a collaboration service to enable communicating between end users (e.g., chat, sharing content, etc.), a library service to manage document access and editing, and so on.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
   providing, by the one or more computers, data for a user interface, the user interface comprising one or more user interface elements for initiating creation of a new container-based server environment;
   receiving, by the one or more computers, data indicating user interaction with the one or more user interface elements;
   in response to receiving the data indicating user interaction with the one or more user interface elements, creating, by the one or more computers, a new container-based server environment comprising multiple different containers hosted by a remote cluster of processing nodes, the multiple different containers being configured to provide different services that interoperate with each other, including:

accessing stored configuration data that (i) specifies a predetermined set of multiple software images in a repository to use in generating new container-based server environments and (ii) indicates initialization operations to initialize containers generated using the predetermined set of multiple software images;

retrieving, from the repository, each of the software images in the predetermined set of multiple software images;

generating a container on the remote cluster for each of the predetermined set of multiple software images; and performing the initialization operations indicated by the stored configuration data to initialize the containers, wherein the initialization operations configure the containers to communicate with each other through an application programming interface; and providing, by the one or more computers, access to the new container-based server environment.

2. The method of claim 1, wherein the new container-based server environment is generated based on a predetermined set of configuration information without receiving any user-specified operating parameters for the new container-based server environment.

3. The method of claim 1, wherein the one or more user interface elements are a single user interface element, wherein interaction with the single user interface element causes the one or more computers to initiate creation of the multiple different containers of the new container-based server environment without further interaction from the user.

4. The method of claim 1, comprising:
in response to receiving data indicating interaction with the one or more user interface elements, presenting a prompt having a control for receiving user input specifying an identifier for the new container-based server environment; and
receiving, through the prompt, an identifier for the new container-based server environment;
wherein the new container-based server environment is created in response to receiving the identifier for the new container-based server environment.

5. The method of claim 1, wherein providing access to the new container-based server environment comprises:
indicating the new container-based server environment on a management interface and providing one or more tools to adjust configuration of the new container-based server environment; or
operating the new container-based server environment to receive and respond to requests from one or more client devices.

6. The method of claim 1, wherein creating the new container-based server environment comprises:
accessing a data set indicating characteristics of an installed instance of a software application; and
configuring the multiple different containers to replicate the characteristics of the installed instance of the software application.

7. The method of claim 6, wherein the data set comprises metadata, one or more data cubes, and/or one or more data caches.

8. The method of claim 6, wherein the data set is an archive or file system that indicates an application state of the software application, and
wherein configuring the multiple different containers comprises configuring the multiple different containers to have the same application state indicated by the archive or file system.

9. The method of claim 1, wherein creating the new container-based server environment comprises generating data structures configured to store state information for the multiple different containers in a manner that persists after the containers are stopped and unloaded.

10. The method of claim 1, comprising receiving, using the one or more user interface elements, input to the user interface that indicates (i) a cluster of processing nodes, (ii) credential information for accessing the cluster, and (iii) a data source indicating a previous installation of one or more software packages;
wherein the new container-based server environment has a configuration derived from the previous installation of the one or more software packages, and creating the new container-based server environment comprises:
extracting data files of the one or more software packages from the data source;
distributing copies of the extracted data files among the containers; and
altering configuration information for the containers based on the extracted data files.

11. The method of claim 1, wherein the remote cluster is a cluster of processing nodes of a remote cloud-computing-based server system operated by a third party.

12. The method of claim 1, wherein the multiple different containers each implement a customized application programming interface layer for communicating among the containers.

13. The method of claim 1, wherein the remote cluster provides a first management application programming interface (API) for control of the containers; and
wherein the multiple different containers each implement a second management API for control of the containers, the second management API enabling communication with each of the multiple different containers over a network from a management application on a client device separate from management functionality provided by the remote cluster.

14. The method of claim 1, wherein the multiple different containers are configured to interoperate to provide online analytical processing (OLAP) capabilities to a plurality of remote client devices over a network.

15. The method of claim 1, wherein a software image of the multiple software images comprises a template for generating a container.

16. The method of claim 1, wherein a software image of the multiple software images includes executable code for an application or service.

17. A system comprising:
one or more computers; and
one or more computer-readable media storing instructions that, when executed by the one or more computers, cause the one or more computers to perform operations comprising:
providing, by the one or more computers, data for a user interface, the user interface comprising one or more user interface elements for initiating creation of a new container-based server environment;
receiving, by the one or more computers, data indicating user interaction with the one or more user interface elements;
in response to receiving the data indicating user interaction with the one or more user interface elements, creating, by the one or more computers, a new container-based server environment comprising multiple different containers hosted by a remote cluster of processing nodes, the multiple different containers being configured to provide different services that interoperate with each other, including:
- accessing stored configuration data that (i) specifies a predetermined set of multiple software images in a repository to use in generating new container-based server environments and (ii) indicates initialization operations to initialize containers generated using the predetermined set of multiple software images;
- retrieving, from the repository, each of the software images in the predetermined set of multiple software images;
- generating a container on the remote cluster for each of the predetermined set of multiple software images; and
- performing the initialization operations indicated by the stored configuration data to initialize the containers, wherein the initialization operations configure the containers to communicate with each other through an application programming interface; and providing, by the one or more computers, access to the new container-based server environment.

18. One or more non-transitory computer-readable media storing instructions that, when executed by one or more computers, cause the one or more computers to perform operations comprising:
- providing, by the one or more computers, data for a user interface, the user interface comprising one or more user interface elements for initiating creation of a new container-based server environment;
- receiving, by the one or more computers, data indicating user interaction with the one or more user interface elements;
- in response to receiving the data indicating user interaction with the one or more user interface elements, creating, by the one or more computers, a new container-based server environment comprising multiple different containers hosted by a remote cluster of processing nodes, the multiple different containers being configured to provide different services that interoperate with each other, including:
  - accessing stored configuration data that (i) specifies a predetermined set of multiple software images in a repository to use in generating new container-based server environments and (ii) indicates initialization operations to initialize containers generated using the predetermined set of multiple software images;
  - retrieving, from the repository, each of the software images in the predetermined set of multiple software images;
  - generating a container on the remote cluster for each of the predetermined set of multiple software images; and
  - performing the initialization operations indicated by the stored configuration data to initialize the containers, wherein the initialization operations configure the containers to communicate with each other through an application programming interface; and
- providing, by the one or more computers, access to the new container-based server environment.

* * * * *